Figures 1, 2:
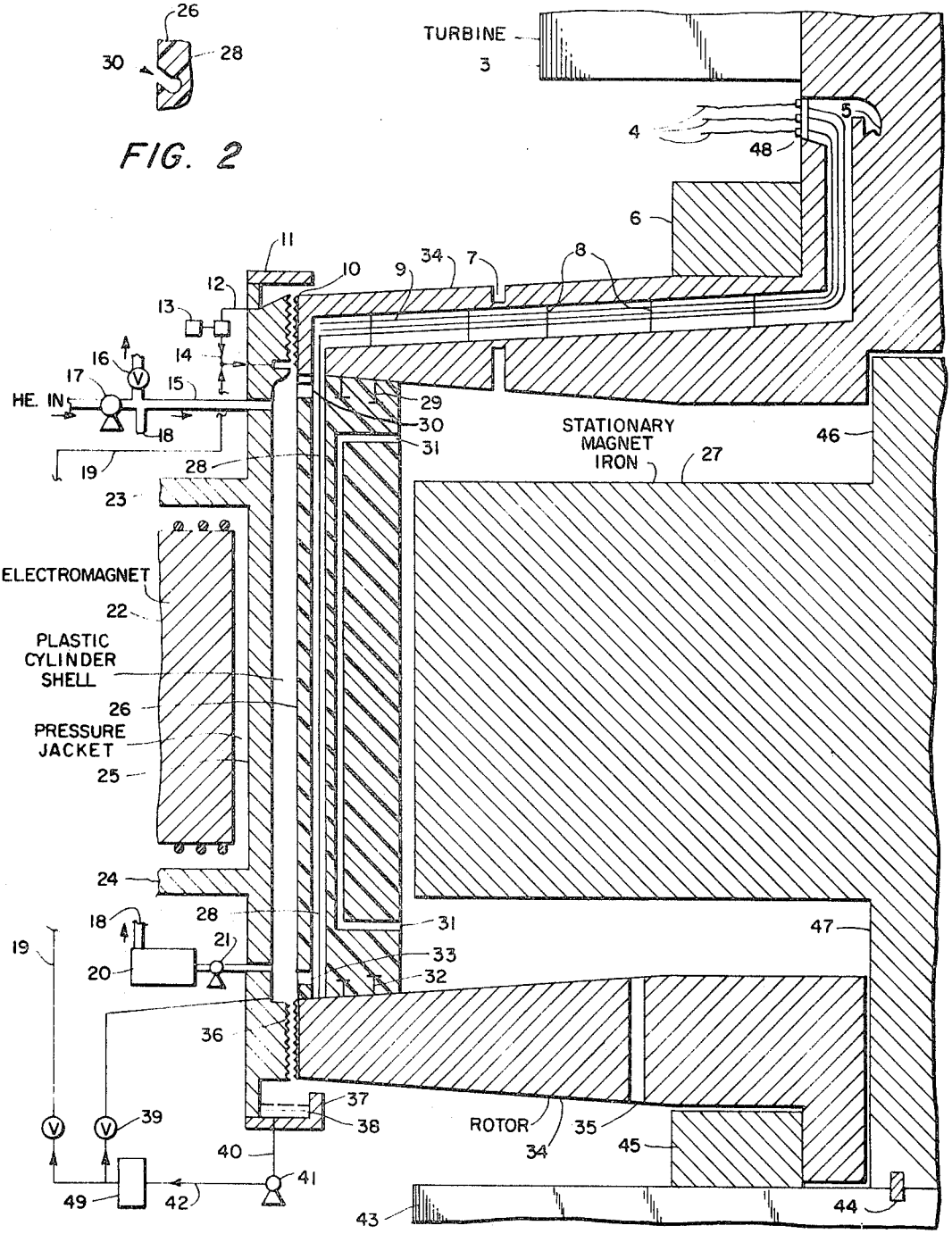

United States Patent

[11] 3,602,746

| [72] | Inventor | John C. St. Clair<br>Box 216 Rural Route 5, London, Ohio 43140 |
|---|---|---|
| [21] | Appl. No. | 21,990 |
| [22] | Filed | Mar. 23, 1970 |
| [45] | Patented | Aug. 31, 1971 |

[54] MOTOR-GENERATOR WITH HOLLOW PLASTIC ROTOR ROTATING IN HIGH PRESSURE CHAMBER
1 Claim, 2 Drawing Figs.

[52] U.S. Cl. .................................................. 310/55,
310/43, 310/67 R, 310/157, 310/261, 310/262
[51] Int. Cl. .......................................................... H02k 9/00, H02k 1/04
[50] Field of Search ........................................... 310/40, 43, 55, 61, 67, 87, 89, 157, 158, 261, 262, 265, 266

[56] References Cited
UNITED STATES PATENTS

| 2,634,375 | 4/1953 | Guimbal | 310/55 X |
| 2,663,808 | 12/1953 | Rosenberg et al. | 310/262 X |
| 2,873,393 | 2/1959 | Baudry | 310/55 |
| 3,049,633 | 8/1962 | Cain | 310/61 X |
| 3,114,323 | 12/1963 | Moser | 310/261 X |
| 3,133,504 | 5/1964 | Haynes | 310/67 R X |
| 3,157,808 | 11/1964 | Lloyd | 310/67 X |

*Primary Examiner*—Hilton O. Hirshfield
*Assistant Examiner*—Mark O. Budd

ABSTRACT: In a turbine driven generator of three phase alternating current the field is stationary and the conductors are mounted on a rotating cylindrical shell of hollow plastic. Outside the shell is kept helium maintained at 3000 pounds per square inch pressure and inside the plastic cylindrical shell is maintained at atmospheric pressure, the difference in pressures resisting the high centrifugal stresses on the plastic and permitting the conductors to have a velocity relative to the magnetic field of 50 percent to 100 percent greater than conventional design. THe gas at 300 p.s.i. is picked up by scoops on the rotor and is forced through tubes in the plastic where the conductors lie producing an unusually good cooling effect and permitting much higher current flow rates in the conductors than usual. Streamlining of the parts contacting gas at high velocities is very good where desired and the efficiency of the generator is very high. The above generator can be easily adapted to make a very efficient direct current motor or generator.

PATENTED AUG 31 1971    3,602,746

INVENTOR
JOHN C. ST. CLAIR

MOTOR-GENERATOR WITH HOLLOW PLASTIC ROTOR ROTATING IN HIGH PRESSURE CHAMBER

In the design of rotating equipment to convert mechanical power to direct or alternating current, or the reverse operation, it is highly desirable to have the conductors cut the lines of magnetic flux at as high velocity as possible since the amount of copper conductors theoretically required is inversely proportional to the square of the above velocity. This has been limited in previous equipment by the centrifugal force applying high stresses on the steel rotors used. It is known that by tapering a rotating disk so that thick sections at the center of the disk support thinner and hence lighter sections at the rim of the disk much higher velocities at the rim of the disk may be obtained. However this has not been practical to a large degree in designing prior steel rotors since not much tapering of the prior steel rotors may be done. In my disclosed invention I have discovered a way so that the metal parts of my rotor can be tapered so that they can stand much higher rim velocities.

Also cooling of the conductors is a serious problem with previous motor-generators. Much higher rates of operation could be obtained with existing equipment if a satisfactory method of cooling the conductors could be devised. In my invention I have cool gas available, preferably helium, at pressures ranging up to 3000 pounds per square inch pressure or more under conditions where it can be very conveniently forces through ducts holding my conductors so that extremely good cooling can be obtained of the conductors. This permits very high rates of current flow through my conductors.

FIG. 1 of the drawing shows a view of one form of my apparatus taken perpendicular to the axis of rotation of the rotor. Only half of the view is given since my equipment is symmetrical around the axis of rotation (except for the magnet) and the two sides of the view through the center line of the axis of rotation are identical.

FIG. 2 of the drawing shows a view of the opening or hole 30 with the view being taken parallel to the axis of rotation of the rotor.

Referring to the drawing there is a rotor at 34 which revolves at 3600 revolutions per minute in bearings 45 and 6. Rotor 34 is driven by turbine 3. Bearing 45 rests on foundation support 43.

It is noticed that the horizontal upper and lower disks of rotor 34 are tapered. In this way they can stand much higher stresses at the rims due to the supporting effect of the thicker parts near the centers of the disks. It has been found that rotating disks can stand rim velocities of 1000 feet per second or even more when the disks are tapered. This applies to very high strength maraging-type steels and to forged aluminum high strength alloys.

Inside the rotor 34 is stationary magnet iron 27. The lower end of stationary magnet iron 27 is designated by numeral 47 which protrudes through the center of the lower end of rotor 34 and is keyed to the stationary support 43 by key 44. The upper end of stationary magnet iron 27 is designated by numeral 46 and is held vertical by protruding into rotor 34.

The portion of the rotor that is between the end disks of the rotor 34 is plastic cylinder shell 26. This is held integral to the end disks of rotor 34 not only by the fact that the plastic will cement itself to the metal of rotor 34 on casting the plastic but also by fasteners 29 and 32 which the plastic when cast will cast itself around.

In the outer part of plastic cylinder shell 26 is conductor-carrying conduit 28. Cooling gas is picked up by opening of hole 30 which is shown to slant from the radius of rotation of the rotor and act as a scoop picking up gas as shown in FIG. 2.

Cooling gas passes through conduit 28 cooling the conductors it contains and passes out hole or opening 33. The cooling gas which is preferably helium at pressures of the order of 3000 pounds per square inch pressure is a better cooling agent than water yet without water's disadvantage of conducting electricity. This allows the conductors to be just insulated by a partially open winding of insulating material and cooling of the conductor is done by direct contact of the cooling gas with the bare metal surface of the conductor.

The electrical conductor in conduit 28 goes upward out of the conduit 28 and in the upper metal disk of the rotor 34 joins two other wires. (It is desirable to join, coaxially if necessary, the conductor of one phase of the alternating current produced by the generator shown with the two other phases produced when it becomes necessary to pass the electricity through metal parts of the apparatus to greatly reduce the varying magnetic fields of the combined conductors. The generation of the other two phases of the current is identical to that of the one phase shown and is hence not shown. At the lower end of the conductor shown in conduit 28 the lower ends of the conductors are obviously joined which is not shown.) The three wires are shown at 9. They are held up at intervals by supports like shown at 8. The wires pass out of the shaft of rotor 34 by brushes 48 and current is taken off by wires 4.

Brushes 48 may be conventional using designs where it is desired to take large amounts of current from a revolving shaft. As for example brushes 48 may be individually designed as electrodes dipping into annular channels of mercury around the shaft. Or, since there is so much current to be transmitted from the shaft a brush may be just a small stream of liquid metallic sodium or potassium or a mixture of sodium and potassium flowing against the shaft.

The wires 9 are cooled by some of the high pressure gas picked up by hole 30 because of its scooplike action. This gas passes to brushes 48 where it enters conduit 5 which passes to an outlet, on the outer surface of plastic cylinder shell 26, not shown.

Cooling of the gas at atmospheric pressure inside the rotor is accomplished by air entering through hole 35 and then by centrifugal action of the rotating rotor passes out through hole 7.

If helium is used as the gas under pressure outside the plastic cylinder shell 26 the helium will very slowly tend to diffuse or flow through the plastic. Small diameter conduit 31 is located in the wall of plastic cylinder shell 26 to act as a vent for any diffusing helium.

Outside the rotating plastic cylinder shell 26 is pressure jacket 25. This jacket contains the high pressure gas that resists the centrifugal stress on the plastic cylinder shell 26. This jacket 25 may be made of glass fiber reinforced plastic but is preferably made of nonmagnetic metal. Pressure jacket 25 is supported by supports 23 and 24.

Helium entering as needed and compressed by compressor 17 enters, by pipeline 15, the high pressure space between the plastic cylinder shell 26 and pressure jacket 25. This helium will have to be cooled to remove the heat generated in the apparatus. This is done by taking off the helium through pump and pipeline 21, and it is forced through cooler 20, where it is cooled. Then the cooled helium is returned by pipeline 18 and pipeline 15 to between the pressure jacket 25 and the plastic cylinder shell 26. When it is desired to reduce the pressure of helium in the apparatus the valve in valved pipeline 16 is opened.

The escape of the helium from between the pressure jacket 25 and the plastic cylinder shell 26 is prevented by rotating labyrinth seals 10 and 36. Rotating labyrinth seals 10 and 36 are of conventional construction being a series of orifices made by saw teeth on the both sides of the path that fluid must escape out of. To make the power loss very low through the labyrinth seals a liquid shown at 38 is used to flow through the seals 10 and 36. Mercury is the ideal liquid because of its high density. However mercury has the disadvantage that it slowly dissolves aluminum and iron alloys are required to make the upper and lower disks of the rotor 34 out of. This is not too undesirable but if magnetic iron alloys are used for the rotor 34 the top and bottom disks of rotor 34 must be far enough away from the magnetic circuit of the apparatus to not draw lines of magnetic flux through them. Also more care will be needed to get the electrical current produced out of the apparatus by wires 9. Therefore with aluminum high strength alloys for rotor 34 liquids like perfluorinated hydrocarbons, which are very stable, and have a specific gravity of about two are preferred.

A reservoir of the liquid 38 used for sealing purposes is kept in the trough formed by trough 37 and the bottom of pressure jacket 25. This passes out by pipeline 40 and is pumped by pump 41 through pipeline 42 and cooler 49 to valved pipeline 39 and valved pipeline 19. Pipeline 39 conveys part of the sealing liquid 38 back to just above the lower labyrinth seal 36. Valved pipeline 19 takes the rest of the sealing liquid 38 to just below the labyrinth seal 10. The sealing liquid escaping from the labyrinth seal 10 is caught by the trough 11 on top pressure jacket 25 and flows by pipeline 12 to pump 13 which pumps it by pipeline 14 to join other sealing liquid 38 just mentioned flowing to just below the labyrinth seal 10.

A cooler is not shown on the sealing liquid passing through pipeline 12 and pump 13 since in many cases a cooler is not needed. The flow of sealing liquid through pipeline 19 is usually large with much sealing liquid falling downward from the place where the sealing liquid enters the bottom of labyrinth seal 10. However in some cases, as when relatively higher gas pressures between plastic cylinder shell 26 and pressure jacket 25 are used, the sealing liquid in passing through the labyrinth seals 10 and 36 may heat up to a degree that unduly heats up the metal parts of the labyrinth seals 10 and 36. In this case each labyrinth seal is made in stages of pressure reduction with the sealing liquid being removed, cooled and then put back in the seal between the pressure reduction stages.

The design of labyrinth seals has been studied quite thoroughly over the years for pumps and fans for liquids and gases and recently for the gas seals needed for the gas turbine engines on jet airplanes. The last work has enabled very efficient and light labyrinth seals to be designed whose efficiency or rather leakage can be predicted in advance within an error of less than 10 percent. The reader is referred to this last work which is reviewed in *Gas Turbine Engineering Handbook*, edited by John W. Sawyer, Gas Turbine Publications, Inc., Stamford, Conn., 1st Edition, 1966, pages 120–123. For instance a mercury seal with a clearance of 0.025 inch with 6 rows of saw teeth placed close together works very well for a 3000 pounds per square inch gas pressure. For a perfluorinated hydrocarbon sealing liquid with a density of 2 grams per cubic centimeter the identical frictional and leakage loss is given by a clearance of 0.25 inch with 39 rows of saw teeth placed close together.

Electromagnet 22 is shown that completes the magnetic circuit of which stationary magnet iron 27 is part of.

The generator illustrated has the advantage that it produces practically pure sine curve form of three phase alternating current.

It will be noticed by those familiar with the design of direct current motors and generators that the design illustrated for a three-phase alternating current 60-cycle generator can be easily changed to provide very large size direct current motors and generators. The design of the magnetic circuit is such that it can be designed so that that the magnetic circuit is only cut by the conductors part of a single rotation of the rotor. This together with the smooth even variation of the current producing process makes it easy to design a direct current generator or motor so that the voltages from conductors at opposite diametrical positions on the rotor are very nearly equal. This makes the commutation of the current from the conductors so that direct current is obtained very easy. Methods described for taking off the DC from the conductors are sufficient. A large and very practical application of the use of my DC motors is to use the direct current from a large magnetohydrodynamic power plant to operate a DC motor that then drives one of my AC generators.

Construction of my apparatus is relatively easy and cheap. The plastic parts are cast onto the finished metal parts by the process known as polymerization casting. In this the liquid raw material of plastics such as epoxy plastic, or polyester plastic or methacrylate plastic is mixed with a very small amount of a material called a catalyst and the liquid mixture is put in a mold and the liquid raw material after a period of time, that can be varied by varying the concentration of the catalyst, changes into the solid desired plastic whose shape is the shape of the mold. In the present case the metal parts are first assembled for the rotor 34 and its supports. Then a thin metal sheet is wrapped around the inside stationary magnet iron 27 to form the inside of the plastic cylinder shell 26 that is to be cast. For the small duct 31 very small diameter metal tubing is inserted to prevent the plastic from being cast in this space. Also the conductor carrying duct 28 is provided with a metal tube to form the core to prevent the plastic from being cast in the space conduit 28 is supposed to occupy. After the casting procedure the metal forms and cores are dissolved out with acid or alkali or ammonia plus oxygen dissolved in water. Ammonia plus oxygen in water is a rapid solvent for copper. Aluminum will dissolve in either acid or alkali solutions. Metal parts that must not be dissolved when the expendable metal cores and molds are dissolved out can be protected by first giving them a coat of ordinary lacquer before the casting procedure. This works very well with parts that are not touched with the liquid raw materials for the plastics being cast since these raw materials are themselves quite good solvents. Examples of these metal parts are the electric conductors. Then later the lacquer may be removed by solvents, like methyl alcohol, since the plastics are not normally affected by solvents and, if they are affected, they are affected by solvents of only a few types.

While good balancing of the rotor is a necessity the degree of precision necessary with the casting of the plastic is not as high as may be expected. For a 5-foot diameter rotor with a 6-inch thick walled plastic cylinder shell 26 rotating at 3600 r.p.m. and with the outer pressure being 3000 pounds per square inch the precision necessary in the casting of the plastic is of the order of 0.1 inch.

It is to be noted that the bearings for the rotor are not drawn to scale and the usual check by mechanical engineers in designing rotating bodies must be done for every case. Multiple bearings on each end of the rotor have advantages but are not shown because they are obvious. Also automatic pressure control, of the helium gas entering at 17 and being let off at 16, varying with the speed of rotation is a necessity but is not shown because it is obvious.

Reinforcing the plastic with glass fibers as is done so often with polymerization cast plastics may be done but it complicates the casting procedure since the glass fiber reinforcing must be done evenly to prevent out-of-balance in the rotor. Also glass fiber reinforcing considerably adds to the weight of the plastic cylinder shell 26 and may require extra gas pressure outside the plastic cylinder shell 26 to counter balance the extra weight. However when plastic cylinder 26 is over 10 feet long some reinforcing by glass fiber fabric is usually necessary to prevent undue flexibility in the plastic cylinder. Use of glass fabric reinforcing is described in *Plastics in Building* by Skeist, Reinhold Publishing Co., 1966, pages 83–116.

The conduits in the metal part of the rotor are made by the procedure called electrochemical machining operating from holes, not shown, that are later filled up. The steels called "-maraging" steels have extremely high strengths and can be welded. The supports 8 for the conductor wires 9 can be supported by making the conduit they are in with one dimension perpendicular to the lengthwise axis of the conduit larger than the other dimension perpendicular to the lengthwise axis of the conduit. This permits the supports 8 to be slipped into the conduit and then rotated into grooves and then cemented solidly be epoxy cement.

In this patent the word "plastic" signifies a solid material made by joining together by chemical bonds large numbers of the same organic molecule. An organic molecule is a molecule that contains at least one carbon atom with at least a hydrogen atom or a halogen atom attached directly to the carbon atom.

I have described helium as the preferred gas to be used with my apparatus. Hydrogen may also be used and gives a loss, due to friction of the rotating rotor, of only a half of that of helium but this is not usually needed.

Since a generator always acts some of the time as a motor and a motor acts always some of the time as a generator I refer to my apparatus as a motor-generator.

I have illustrated my motor-generator as a relatively small alternating current generator. However my motor-generator may be used for an alternating current generator of 500,000 kilowatt capacity or larger very profitably if provision is made to reduce the varying fields from the conductors carrying very large varying currents near the metal parts of rotor 34. The use of three-wire coaxial conductors is required when the current is taken through the metal parts of the rotor 34. The use of three or more separate three-wire coaxial conductors for current as it is transmitted from the rim of the rotor to its shaft at the end of the rotor, allows the field of the conductors transmitting current around the rotor to these three or more three-wire coaxial conductors to be practically eliminated.

With very large alternating current generators, and also with direct current generators and motors, it is necessary to have a large number of conductors in the metal disks at the ends of rotor 34 and it is desirable to make each disk at the ends of rotor 34 as two separate thinner disks with the conductors between the two thinner disks. This allows the fabrication of the conductors in cavities on the surface of one of the two thinner disks, for the end of rotor 34, and the later fastening of the other of the two thinner disks, for the end of rotor 34, onto the thinner disk on which the conductors have been placed.

In summary I can say that my invention allows the conductors in a motor or a generator to cut the lines of magnetic flux at a 50 percent to 100 percent higher velocity than that previously attainable which permits a great reduction in the amount of copper conductors required and hence the size and cost of a motor or generator. Also I have provided a highly improved method for removing heat from the conductors which lets a motor or generator with a given amount of conductors to be operated at much higher current and hence power rates.

I claim:

1. A motor-generator comprising: a cylinder, means to rotate the cylinder around its longitudinal axis and thereby supply power to the cylinder, electric conductors mounted on the cylinder, an electromagnet placed so that when the cylinder rotates, the electric conductors cut lines of magnetic flux, means to convey electrical current thereby produced in the electric conductors to stationary terminals; in which the novelty is that the cylinder is hollow and made of plastic and centrifugal stress on the cylinder due to its rotation is reduced by means to maintain gas on the outside of the hollow cylinder at higher pressure than gas on the inside of the cylinder, that the means to maintain the higher pressure of the gas outside the rotating cylinder being a larger hollow stationary cylinder surrounding the rotating cylinder with seals at the ends of the stationary cylinder to prevent gas under the higher pressure from escaping, said seals being provided with means to pass liquid between the stationary and the rotating parts of the seals to assist in preventing loss of the higher pressure gas, there being means to force gas between the inner rotating cylinder and the outer stationary cylinder, and that the lines of magnetic flux, which the conductors on the rotating cylinder are mentioned as cutting, pass through stationary magnet iron, inside the rotating cylinder, and the electromagnet which is outside the rotating cylinder and which is stationary.